April 21, 1959 C. P. REEG ET AL 2,882,912
SOLIDS FLOW CONTROL PROCESS AND APPARATUS
Filed June 25, 1954 2 Sheets-Sheet 1
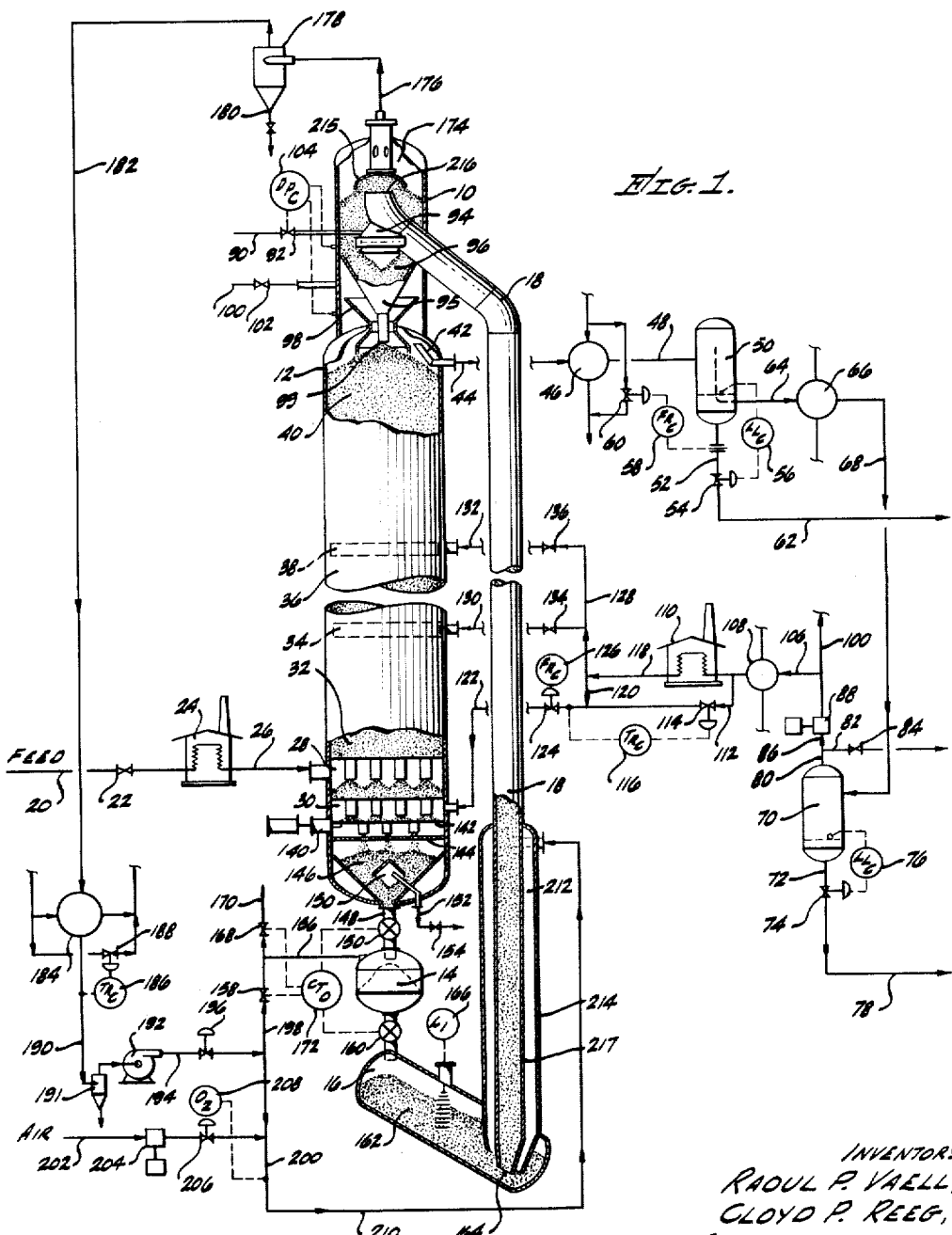
FIG. 1.
INVENTORS.
RAOUL P. VAELL,
CLOYD P. REEG,
AGENT

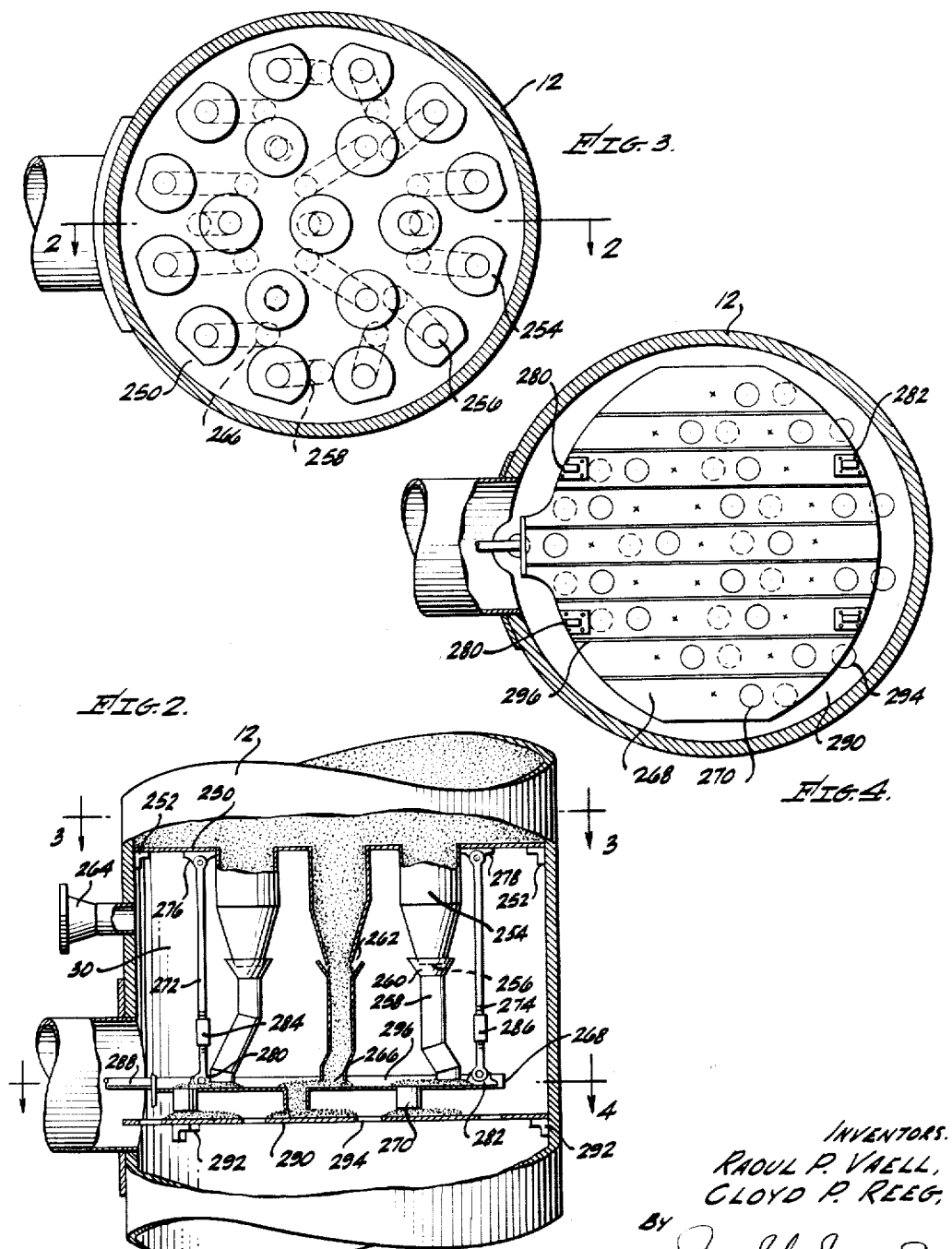

United States Patent Office

2,882,912
Patented Apr. 21, 1959

2,882,912

SOLIDS FLOW CONTROL PROCESS AND APPARATUS

Cloyd P. Reeg, Long Beach, and Raoul P. Vaell, Los Angeles, Calif., assignors to Union Oil Company of California, Los Angeles, Calif., a corporation of California Application June 25, 1954, Serial No. 439,262

7 Claims. (Cl. 134—155)

This invention relates to a process and apparatus for the control of flow of granular solid material and in particular relates to a process and apparatus for the simultaneous regulation of the flow of moving beds of granular solid contact materials and the supplemental fluid treatment of such solids as catalysts in hydrocarbon conversion processes in which the contact material is circulated successively through a contacting or reaction zone and also through a solids regeneration or reheating zone. It is intended that the invention apply generally to the control of moving granular solids and not be limited to use with hydrocarbon conversion catalyst solids or solids in a particular process.

The movement and recirculation of granular or powdered solid materials is of great importance in a considerable number of industrial operations. Foremost among these are those processes in which granular solids such as adsorbents or catalysts are passed through a treating column in which a fluid, gaseous or liquid, is also passed to contact the solid material. In these operations particularly, a constant flow rate of granular solids is essential to adequate control of the operation. Equally essential is the control of the rate of solids flow through any given part of the cross-sectional area of the column. It is most desirable that a uniform flow of granular solids be maintained throughout the entire cross-sectional area. Failure to maintain such uniform flow has very adverse effects in such contacting processes as adsorptive fractionation of fluid mixtures, in contact coking, catalytic cracking and other hydrocarbon conversion processes involving granular solids such as a catalyst, the other well-known catalytic processes such as Fischer-Tropsch synthesis, and any other fluid-solids contact processes. Continuous ion exchange operations involving contact of liquids with the solid ion exchange resins and like materials are benefited by this invention.

The attempt to withdraw granular solids from such contacting vessels by means of a conical draw-off section connecting the bottom of a large diameter column with a relatively small diameter outlet generates solids flow effects which may be reflected as a nonuniform solids flow pattern completely through the height of the contacting column. For example, the center portion of the solids bed may flow downwardly from 10 to as much as 500 percent faster than the material adjacent the walls of the column. In operations where solids flow control is critical, as in those operations mentioned above, this results in nonuniform utilization of the catalyst or adsorbent, insufficient contacting of the fluid passed in contact with the solid material, and in many cases prevents the process from being continued over desirably long lengths of time.

In modern petroleum and other hydrocarbon fraction refining techniques, such fractions are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 1000° F. and including the light and heavy naphthas or gasolines and the light and heavy gas-oil fractions, coker distillates, and the like, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents or diesel or jet engine fuels, and the like.

In such hydrocarbon conversion processes, the control of the circulation rate and simultaneously the control of the downward velocity of the granular solid material at all points throughout the cross-sectional area of the contacting and regeneration columns to provide a uniform downward solid velocity is of extreme importance. Conventionally, this problem has been handled by providing a plurality of superimposed transverse spaced baffles having a fewer number of apertures in successively lower baffles in an attempt to secure a uniform solids velocity in the moving bed of solids passing downwardly through the reactor. This type of structure has not proven entirely satisfactory and is particularly undesirable from the standpoint of the height of the structure required which in turn increases the over-all height of the apparatus.

In addition, in solids-fluid contacting processes generally and in hydrocarbon conversion processes in particular, it is necessary to strip residual fluid materials adhering to the contact material prior to removal from the contacting zone in order to maintain a high product yield by eliminating losses due to combustion of these materials when the catalyst or contact material is regenerated. Thorough stripping requires fairly high stripping gas velocities and the quantity of stripping gas needed rises to undesirable values when such stripping is conducted in a separate zone near the bottom of the contacting vessel. In some cases the stripping gas has an adverse effect upon the granular solids, and this is true particularly in the case of steam stripping of hydrocarbon conversion catalysts. Accordingly, in attempting to maintain high stripping gas velocities to insure adequate stripping and at the same time preserve the uniform withdrawal of granular solids throughout the column cross section and simultaneously attempt to reduce the quantity of stripping gas required these numerous heretofore unsolved problems present themselves.

The present invention therefore is directed to an improved process and apparatus for treating granular solids in solids-fluid contact processes which permit positive control over the granular solids circulation rate, insure a uniform downward velocity of granular catalyst or contact material throughout the cross-sectional area of the column, minimize the total quantity of solids stripping fluid needed to strip the solids material and yet maintain high and efficient spent solids stripping.

It is a specific object of this invention to provide an improved process for the simultaneous stripping of spent solid contact materials and the accurate control over the quantity and velocity of the solid contact material.

It is also an object of the present invention to provide an improved apparatus for solids-fluid contact operations including a combined granular solids stripper and feeding mechanism whereby the aforementioned objects are accomplished.

It is also an object to provide, in fluid-solids contact apparatus having the aforementioned improved mechanism, a substantial reduction in contacting vessel height.

Other objects and advantages of the present invention will become apparent to those skilled in the art as the description thereof proceeds.

Briefly, the present invention comprises an improved process and apparatus for the continuous contacting of reactive fluid streams with a downwardly moving bed of solid granular contact material which is recirculated through one or more columns and subjected to treatments with the fluid to be contacted and with a regeneration or reheating fluid. The granular material is passed downwardly through the reaction zone as a compact moving bed by gravity and is contacted with the fluid to be treated. Following this contact and at a point adjacent the lower end of the contacting zone, the entire moving bed of contact material is split into a plurality of individual solids streams at points spaced uniformly throughout the cross section of the contacting column or zone. These individual streams are then passed as confined moving beds downwardly through a plurality of parallel individual stripping zones of reduced cross-sectional area in which the spent granular material is countercurrently contacted with a flow of stripping gas such as steam, hydrogen, hydrocarbon dry gas, and the like. Following this stripping step the solids are passed downwardly from the stripping stage through a plurality of confined zones of still smaller cross-sectional area through which substantially no fluids pass in order to avoid fluid flow interference with the downwardly moving individual solids streams. Granular solids are withdrawn intermittently from the bottom of each of the confined zones in a series of steps to maintain a substantially uniform granular solids removal throughout the cross-sectional area of the column and at the same time to meter positively the discharge of solid material so as to control the absolute rate in terms of volumes or weight per hour of granular solids through the contacting column.

The specific solids stripping and flow control apparatus is unique in that it includes an upper stationary tray provided with a plurality of dependent tubes or conduits, termed stripping conduits or zones, which are spaced uniformly in a regular geometric pattern throughout the cross section of the upper stationary tray which also means that they are spaced uniformly throughout the cross section of the superimposed contacting column. This geometric pattern is preferably a series of concentric circles spaced about a central stripping conduit placed substantially at the vertical axis of the contacting column. Other uniform geometric patterns may be employed such as the hexagonal and triangular patterns conventionally employed in the tube bundles of heat interchangers and the like.

The aggregate cross-sectional area of the stripping conduits is preferably considerably less than that of the superimposed contacting column, such as less than about 50% of this area and in the case discussed subsequently in considerable detail by way of an example, the area amounts to about 41% of the column cross section. By so handling the spent contact material in a plurality of stripping conduits or zones of low cross section, highly efficient solids stripping is obtained at relatively high countercurrent fluid velocities, but which are insufficient to impede downward solids flow, and at the same time the total quantity of stripping fluid required is reduced to values between about 10% and 50% of the rates formerly required.

The granular solids following the stripping step are passed in individual streams from each of the stripping conduits or zones successively through a distributing conduit or zone. The upper ends of the distributing conduits are spaced apart from the outlet of and in the same uniform geometric pattern as the stripping conduits referred to above. Stripping gas engaging zones are thus provided at the point where each distributing conduit joins its respective stripping conduit. These are described further below. The lower ends of the distributing conduits are spaced in an irregular geometric pattern and arranged in a plurality of rows which are parallel to each other and parallel to a transverse line perpendicular to the vertical axis of the contacting column. This nonuniform geometric pattern permits the placement of the distributing conduit outlet openings at points away from the wall of the vessel allowing room for a reciprocable tray movement without enlarging the vessel diameter at this point by adding a bustle. The lengths of these distributing conduits or zones are accordingly unequal but this does not affect the uniformity of stripping because the stripping takes place only in the superimposed stripping conduits which are of equal length. Further, the unequal length does not disturb the downward velocity or flow rate of the granular contact material because this rate or velocity is unaffected by the length or height of the distributing conduit when these heights are greater than 2 or 3 distributing conduit diameters. Even in cases where these heights or lengths do not exceed the two or three diameters indicated, the step of metering positively the volume of solids removed from the distributing conduits, discussed below, prevents nonuniformity of flow or velocity of the individual solids streams.

Spaced immediately below the transverse and usually horizontal plane defined by the lower openings of the distributing conduits or zones is a transverse reciprocable tray provided with a plurality of dependent metering conduits or zones arranged in parallel rows. Immediately below the reciprocable tray is a lower stationary tray provided with a plurality of parallel rows of openings through which granular solids are discharged from the metering conduits of the reciprocable tray. The geometric patterns in which the metering conduits are distributed on the reciprocable tray and in which the discharge apertures are distributed on the lower stationary tray are specially arranged so that upon reciprocation of the reciprocable tray between extreme positions, part of the metering conduits are filled from the corresponding distributing conduits into which they are bought into alignment while being sealed against simultaneous discharge by a misalignment with apertures in the lower stationary tray, and the other part of the metering conduits are discharging solids through corresponding aligned apertures in the lower stationary tray while the corresponding distributing conduits are sealed against solids flow by misalignment with these metering conduits. The arrangement may be such that each metering conduit receives a volume of solids at one extreme and discharges solids at the other extreme of reciprocable tray movement. Another arrangement includes one in which each metering conduit receives a charge of solids at each extreme of tray movement and discharges these solids at an intermediate point of tray movement. A third modification includes the charging of metering conduit at the intermediate point of tray travel and discharge of these solids at each extreme of travel. Other modifications including combinations of these arrangements may readily be employed. A vertical bar or dam is run on top of the reciprocable tray and between each adjacent row of metering conduits to prevent short circuiting of solids from one row to another.

At the point of communication of each stripping conduit with its corresponding distributing conduit is a stripping gas engaging zone through which an individual stream of stripping gas is passed into the downwardly flowing confined solids streams and then is passed upwardly through the stripping conduit countercurrent to the descending solids streams. In this manner any simultaneous flow of gas or other fluid through the distributing conduits is completely avoided and the flow of stripping gas has absolutely no effect upon the velocity or flow rate of the individual streams of solids.

The present invention will be more readily understood by the accompanying drawings in which:

Figure 1 illustrates a flow diagram of a hydrocarbon conversion process employing a moving bed of hydrocarbon conversion catalyst in which the solids flow control and solids stripping process and apparatus of this invention is employed, Figure 2 is an elevation view in cross section indicating the structural detail of the solids stripping and feeding device not detailed in Figure 1 for reasons of clarity of illustration, Figure 3 is a plan view of the upper stationary tray showing the geometrically uniform location of the solids stripping conduits and the geometrically nonuniform location of the outlets of the subjacent distributing conduits, and Figure 4 is a plan view in cross section of the reciprocable tray showing the geometrically nonuniform arrangement of the metering conduits and indicating the points at which each metering conduit is charged with solids and is subsequently discharged of solids.

The present invention will be described in terms of a specific example as applied to the continuous reforming and desulfurization of low-grade petroleum naphtha in the presence of hydrogen and in the presence of a recirculating stream of cobalt molybdate catalyst passed downwardly as a moving bed by gravity through the reaction zone.

The permissible operating conditions for naphtha reforming and desulfurization are from 700 to 1100° F., from 50 to 2000 p.s.i.g., and from 500 to 10,000 s.c.f. of hydrogen per barrel of naphtha feed. The following example gives the specific operating conditions of one installation. A uniform downward catalyst velocity and flow rate is maintained throughout the entire cross section of the reactor and the spent cobalt molybdate catalyst is stripped by means of a primary stream of hydrogen recycle gas in the stripping conduits provided at the bottom of the column by the solids stripping and flow control device referred to above.

Referring now more particularly to Figure 1, the apparatus consists essentially of catalyst separator and pretreating chamber 10 into which the regenerated catalyst is discharged, naphtha reforming column 12 through which the catalyst passes downwardly as a moving bed by gravity, the spent catalyst stripper and controller 140, catalyst pressuring chamber 14 receiving spent catalyst from reforming chamber 12, induction chamber 16 into which the spent pressured catalyst is discharged, and conveyance-regeneration chamber 18 through which the spent catalyst is conveyed and regenerated and discharged for recirculation into separator chamber 10.

The apparatus of this invention as shown in the drawing is for the catalytic reforming and desulfurization of 1100 barrels per stream day of a petroleum naphtha having the following properties:

TABLE I

*Naphtha Feed*

| | |
|---|---|
| Boiling range, ° F. | 240–420 |
| °A.P.I. gravity | 46.3 |
| Sulfur, weight percent | 0.578 |
| Nitrogen, weight percent | 0.020 |
| Knock rating (F-1 clear) | 61.8 |
| Naphthenes, volume percent | 42.0 |
| Aromatics, volume percent | 15.0 |

This naphtha feed is introduced through line 20 at a rate of 1100 barrels per day controlled by valve 22 and is preheated by exchange with hot regeneration gas recycle in interchanger 184 described subsequently, and then is further heated and vaporized in fired heater 24. The naphtha vapor is introduced through transfer line 26 at a temperature of 900° F. and a pressure of 405 p.s.i.g. into naphtha engaging zone 28 in column 12. A primary stream of recycle gas containing hydrogen is introduced through primary recycle and stripping gas manifold zone 30 at a rate of 1700 M s.c.f. per day and at a temperature of 900° F. as hereinafter described.

The mixture of naphtha vapor and hydrogen passes upwardly through primary reforming zone 32 countercurrent to the downflowing bed of cobalt molybdate catalyst. Herein the cyclization of paraffin hydrocarbon to form naphthenes and the endothermic aromatization of the naphthene hydrocarbons takes place and results in a temperature decrease. To maintain an approximately constant temperature profile throughout reaction column 12, a secondary hydrogen recycle stream is introduced into secondary recycle gas engaging zone 34 at a temperature of 1150° F. and at a rate of 1130 M s.c.f. per day to increase the temperature of the reacting mixture to about 910° F. The thus reheated mixture passes countercurrent to the catalyst through secondary reforming zone 36 wherein a further temperature decrease takes place due to continuing endothermic aromatization reactions. A tertiary stream of recycle gas at 1150° F. is introduced into tertiary recycle gas engaging zone 38 at a rate of 1290 M s.c.f. per day to raise the reactant mixture temperature again to about 910° F. The mixture then continues upwardly through tertiary reforming zone 40 from which the effluent is removed from disengaging zone 42 at a temperature of about 880° F. and at 400 p.s.i.g. through line 44.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum forming tendencies when employed as internal combustion engine fuels. The pooled and partially condensed effluent then passes through line 48 and is introduced into separator 50 which is preferably of the type known as a Webre cyclone. Herein the partial condensate, amounting to only a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52, operates coolant bypass valve 60 so that the hot effluent flowing through line 44 is cooled sufficiently to partially condense that desired proportion of the reactor effluent.

The preferred proportion so condensed is a very minor amount ranging between extremes of from 0.01% up to about 10% by volume. Preferably this proportion is between about 0.1% and about 5%, and in the experimental verification of the present invention it has been found that partial condensation of about 2.2% by volume was sufficient to substantially eliminate the so-called heavy ends or polymer from the effluent so as to avoid the usual necessity for rerunning the depropanized liquid product, which invariably results in some thermal degradation forming additional high boiling polymeric materials.

In the present invention, slightly more than 2% by volume of the effluent is condensed and is removed at a rate of 22 barrels per day by means of line 62. This material contains some reformed gasoline boiling below about 420° F. and accordingly is returned for redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described.

The condensed effluent, together with the uncondensed hydrogen recycle gas, flows through line 68 into product separator 70 in which the uncondensed gases are separated from the process product. The reformed naphtha product is removed through line 72 at a rate of 1118 barrels per day controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

TABLE II

*Reformed naphtha product*

| | |
|---|---|
| Boiling range, ° F. | 94–435 |
| A.P.I. gravity | 51.7 |
| Sulfur, weight percent | 0.004 |
| Nitrogen, weight percent | |
| Knock rating (F-1+3 cc. TEL) | 95 |
| Naphthenes, volume percent | 14 |
| Aromatics, volume percent | 40 |

The uncondensed portion of the effluent consists essentially of the hydrogen-containing recycle gas which is removed from separator 70 by means of line 80 and because of the net production of hydrogen in the process, the excess portion of this is bled from the system through line 82 at a rate of 140 M s.c.f. per day controlled by valve 84. Part or all of this gas may be employed as fuel in the fired heaters in the process if desired.

The remaining recycle gas is passed through line 86 and is compressed from 375 p.s.i.g. to 425 p.s.i.g. in recycle gas compressor 88. Part of this compressed recycle gas is passed as a regenerated catalyst pretreating gas through line 100 at a rate of 165 M s.c.f. per day controlled by valve 102 into separator and catalyst pretreating chamber 10. This pretreating gas is introduced below cone-shaped baffle 95 and passes therefrom downwardly through the annular space within the lower periphery of baffle 98 and then directly into the top of the bed of regenerated catalyst in chamber 10. A first part of this gas passes upwardly through sealing leg 99 and pretreating zone 96 countercurrent to the regenerated catalyst. By means of this countercurrent passage of gas the catalyst is pretreated with hydrogen to reduce the higher oxides of cobalt and molybdenum formed during regeneration to the lower oxide. The pretreating gas, along with excess regeneration gas coming down from the top of the lift line, are removed from beneath baffle 94 through line 90 controlled by valve 92. The remaining portion of the pretreating gas introduced through line 100 and passed downwardly into the top of reactor 12, passes radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10. The spent preterating gas and excess regeneration gas are removed from separator chamber 10 at a point below baffle 94 through line 90 at a rate of 205 M s.c.f. per day controlled by valve 92 which in turn is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 M s.c.f. per day through line 106 and is preheated in interchanger 108 to 350° F. in exchange with the reactor effluent after polymer removal (interchanger 66).

Of this preheated recycle gas, 3460 M s.c.f. per day are further heated in fired preheater 110 to a temperature of 1150° F., and 660 M s.c.f. per day passed through bypass line 112 at a rate controlled by valve 114 in response to temperature recorder controller 116. The primary hydrogen recycle gas, introduced into engaging zone 30 at a rate of 1700 M s.c.f. per day and at 900° F., is produced by mixing 1040 M s.c.f. per day of 1150° F. hydrogen flowing through lines 118 and 120 with the 660 M s.c.f. per day of cooler hydrogen from line 112 and this material is then introduced through line 122 into the primary recycle gas engaging zone 30 at a rate controlled by valve 124 in response to flow recorder controller 126.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 M s.c.f. per day and 1290 M s.c.f. per day controlled by valves 134 and 136 respectively.

The spent hydrocarbonaceous catalyst passes downwardly through the column 12 at a rate controlled by solids feeder and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by motor valve 150.

The details of the structure of solids feeder and stripper 140 and the method of operation are described subsequently in connection with Figure 2, 3 and 4.

The spent solids are thus discharged into pressuring chamber 14 when it is depressured to about 400 p.s.i.g. causing a displacement gas to flow upwardly through outlet 148 into the bottom of reactor 12. A seal gas comprising a mixture of this last-named gas and a small portion of the primary recycle gas stream, which passes downwardly through solids feeder 140, is removed from disengaging zone 150 through line 152 at a rate of 140 M s.c.f. per day controlled by valve 154. This gas is mixed with the spent catalyst pretreating gas removed from the upper part of the column through line 90 and is employed as fuel.

The spent granular solids in pressuring chamber 14 are raised in pressure to 430 p.s.i.g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the conveyance-regeneration chamber. Level indicator 166 is provided to indicate the solids level of bed 162.

Valve 160 is then closed, valve 168 is opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140.

Referring now to solids pretreater and separator 10, spent regeneration gases collecting in space 174 are removed therefrom through line 176 at a rate of 1612 M s.c.f. per day and a temperature of 984° F. This gas is passed into solids separator 178 wherein any catalysts fines elutriated from the catalyst stream in separator 10 are removed from the regeneration gas recycle. These solids are removed from separator 178 by means of line 180. The solids-free recycle gas then flows through line 182 through heat exchanger 184 in exchange with the raw naphtha feed referred to above and is therein cooled to a temperature of about 640° F. This temperature is controlled by temperature recorder controller 186 which operates bypass valve 188 so as to control the naphtha coolant passing through interchanger 184. The cooled recycle gas passes through line 190 and is compressed to 430 p.s.i.g. in compressor 192. This recycle gas then flows through line 194 at a rate controlled by valve 196 and is divided into a solids pressuring stream flowing through line 198 to pressure solids in chamber 14, and a regeneration-conveyance stream flowing from line 200.

An oxygen-containing gas, such as air, is introduced via line 202. It is compressed to 433 p.s.i.g. in compressor 204 and is introduced at a rate of 123 M s.c.f. per day controlled by valve 206 in response to oxygen recorder controller 208 for combination with the compressed regeneration-conveyance recycle gas flowing through line 200. The combined oxygen-containing regeneration-conveyance gas then passes at a temperature of about 646° F. and at a rate of 1735 M s.c.f per day through line 210 tangentially into the upper portion of regenerator heat exchange zone 212. This zone is contained within the annulus between the lower portion of conveyance-regeneration conduit 18 and jacket 214 which surrounds concentrically the lower portion of the conveyance-regeneration conduit. The regeneration gas passes downwardly through zone 212 and is preheated therein by means of the exothermic heat of regeneration liberated within the lower part of conveyance-regeneration zone 18 to a temperature of about 706° F. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst. The regenerated catalyst is discharged against baffle 215 which applies a force against the mass of catalyst issuing from conveyance-regenerator conduit 18 and maintains the upwardly moving catalyst at a bulk density substantially equal to the static bulk density thereof.

As stated above, the major part of the coke burn-off from the catalyst occurs in the lower or first part of the conveyance-regeneration zone and a substantial part of this endothermic heat is transferred through the conveyance conduit wall to preheat the conveyance-regeneration gas recycle and to keep the inner conveyance-regeneration conduit wall 217 cool. All of the net endothermic heat of regeneration however is removed as sensible heat in the conveyance-regeneration recycle, with the exception of usual heat losses.

The spent granular catalyst is substantially completely regenerated while passing upwardly through the conveyance-regeneration conduit and is discharged from outlet opening 216 of the conveyance conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited by the height of the conveyor-regenerator or by the velocity of the conveyance-regenerator fluid circulated therethrough, as is the case in the conventional gas lift of suspended solids systems. Once the conveyance fluid rate is sufficient to exceed the force of gravity and friction on the moving bed, the catalyst will move as continuously fed at the inlet and removed from the outlet. Any necessary increases in conveyance-regeneration fluid rate necessary to remove heat from the system have absolutely no effect whatsoever upon the residence time of the catalyst in the system or the degree to which it is regenerated and the only external effect is one of a somewhat increased pressure differential.

Accordingly, in the present process the spent catalyst may be completely regenerated by the removal of the entire quantity of hydrocarbonaceous deactivating materials during conveyance. In the present example, this is accomplished by utilizing an oxygen concentration of about 2.0% at the inlet of the conveyance-regeneration zone. The spent catalyst contains about 4.1% carbon and is discharged into separator 10 after regeneration containing less than about 0.1% carbon and the restoration of activity is essentially 100%.

Because of the novel heat transfer system maintained at the base of the conveyance-regeneration system, very substantial reductions of as much as 75% in the conveyance fluid recycle rate are attained relative to that resulting if the cooling of the gas were limited to a minimum temperature of 750° F., the regenerator inlet temperature needed to maintain spent catalyst combustion because the conveyance fluid recycle stream may be cooled in exchanger 184 to temperatures as low as 150° F. or lower (with provision for condensate removal in separator 191 if necessary) with this particular regenerator.

In the apparatus of this invention, the entire structure above grade level is about 55 feet in height, the reactor column diameter is 4 feet 6 inches, and the conveyance-regeneration conduit is 14-inch schedule 40 pipe. The catalyst is circulated at a rate of 10.3 tons per day and moves at an upward velocity of 15.5 feet per hour through the regeneration-conveyance conduit. This low velocity is totally impossible to maintain in a gas lift or pneumatic suspension conveyor, and herein it permits the complete regeneration of the catalyst during the lifting step.

Referring now more particularly to Figure 2, the lower portion of reactor column 12 shown in Figure 1 is also shown in this figure. In the spent solids stripping and feeder device, upper stationary tray 250 is supported from the walls of column 12 by brackets 252. Dependent from upper stationary tray 250 and spaced uniformly throughout the cross section thereof in a uniform geometric pattern is a plurality of dependent stripping conduits 254 having an upper cylindrical section and a lower conical section terminating in a lower opening 256 of restricted cross section. If desired, these conduits 254 may be cone-shaped. The spent catalyst enters the upper open end of each of the stripping conduits 254 and passes downwardly therethrough as a confined moving bed. Immediately below each stripping conduit 254 and supported therefrom by a plurality of gussets, not shown, are distributor conduits 258 of less cross section than outlet opening 256 of conduits 254. These distributor conduits each have an upper flared portion 260 which surrounds the lower opening 256 of the corresponding stripping conduit and which receives granular solids therefrom. Within the annular space 262 between the lower end of stripping conduits 254 and the inner surface of flared portion 260 is thus provided a stripping gas engaging zone intermediate the ends of each individual catalyst stream passing downwardly successively through the serially connected stripping and distributing conduits. Surrounding the stripping and distributing conduits is stripping fluid manifold zone 30, also shown in Figure 1, and into which opens nozzle 264. This manifold zone 30 communicates with the upper inlet and the lower outlet of each distributing conduit or zone, maintains them at equal pressures, and thus prevents any stripping gas flow therethrough and interference with solids flow from occurring.

In the example described in connection with Figure 1, a primary hydrogen recycle gas flowing at a rate of 1700 M s.c.f. per day and at a temperature of 900° F. is introduced through nozzle 264, distributes itself uniformly throughout engaging zone 30, is divided into a plurality of equal streams which enter engaging zones 262, and pass upwardly countercurrent to the descending individual streams of spent catalyst in stripping conduits or zones 254. Herein a relatively high velocity hydrogen stripping of the spent catalyst using considerably reduced quantities of gas is effected to remove residual quantities of naphtha and other desorbable materials. This hydrogen stripping gas also constitutes the primary recycle gas employed in the first catalytic reforming and desulfurization zone 32 in Figure 1 and passes upwardly through the reactor as described before. It should be noted that in this invention, the normal requirement of an extraneous stripping gas such as steam has been entirely eliminated from all parts of the process. This results in an economic saving and also avoids catalyst deactivation effects resulting from the use of steam stripping.

Positioned immediately below the lower openings 266 of the distributing conduits is located reciprocable tray 268 which is provided with a plurality of dependent metering conduits 270. The reciprocable tray is suspended by a plurality of 3 or more hangers 272 and 274. At the upper ends of the hangers are provided pillow blocks 276, 278, 280, and 282. The hangers are further provided with adjustment turnbuckles 284 and 286 whereby the elevation of reciprocable tray 268 is controlled.

An actuating rod 288 is attached to one edge of the reciprocable tray and extends through a seal out of the column and is attached to a controllable reciprocating motive means, not shown, but suitably consisting of an air cylinder utilizing 150 p.s.i.g. air to operate it.

Disposed immediately below reciprocable tray 268 is the lower stationary tray 290 supported from the walls of column 12 by brackets 292 and provided with a plurality of discharge apertures 294 arranged in a nonuniform geometric pattern. It is readily seen that upon reciprocation of tray 268, metering conduits 270 alternately receive a fixed volume of granular solids from its corresponding distributing conduit 258 and then discharge these solids through a corresponding aperture 294. It is also seen that while each metering conduit is aligned with distributing conduit 258 it is misaligned with any discharge aperture 294 and thus sealed against solids discharge by an imperforate area of lower tray 290. When a metering conduit is aligned with aperture 294, solids discharge through distributing conduit 258 is prevented by an imperforate area of reciprocable tray 268.

The absolute volumetric rate at which the granular solids are discharged is readily varied by increasing or decreasing the rate of reciprocation of tray 268. Each complete reciprocation of the reciprocable tray discharges a fixed volume of spent catalyst which is substantially equal to the aggregate volume of metering conduits 270 when such conduits charge and discharge once in each tray cycle. The reciprocable tray may be oscillated up to about 15 cycles per minute and the volumetric rate of solids discharge may be further increased by lengthening metering conduits 270 to provide whatever solids rate is desired.

Referring now more particularly to Figure 3, colum 12 is again shown in a transverse or plan view from just above upper stationary tray 250. A plurality of 19 dependent stripping conduits 254 having 8 inch inside diameters are shown each terminating in a lower 4 inch diameter outlet 256. The detail of the upper flared portion 260 of the corresponding distributing conduits 258 has been omitted for sake of clarity. The distributing conduits 258 are 3 inches inside diameter and are indicated by means of the dotted lines. Their lower outlet openings 266 are also shown. It is readily apparent from Figure 3 that the plurality of stripping conduits are arranged in a uniform geometric pattern on the upper stationary tray 250 and that the outlet openings 266 are arranged in a nonuniform geometric pattern consisting of a plurality of 9 rows arranged parallel to the direction of tray reciprocation.

Referring now more particularly to Figure 4, a cross section view of column 12 is again shown showing the reciprocable tray 268. This try is constructed from a plurality of structural steel channels placed web to web with the adjacent webs upward. These webs are indicated at 296 and constitute the dams previously mentioned which prevent solids short circuiting from one row to another. When the webs are placed downward, separate dams consisting of strips of steel placed on edge between the rows may be used.

Disposed in a nonuniform geometric pattern throughout the surface of reciprocable tray 268 are the dependent metering conduits 270 which are indicated in this figure as the solid circles within the confines of tray 268 and arranged in a series of 9 rows. The broken circles indicate the position of discharge apertures 294 disposed on lower stationary tray 290. The relative positions of lower outlet openings 266 of the distributing conduits 258 are indicated by an $x$. It will be seen then that reciprocable tray 268 is shown in Figure 4 in the intermediate position as in Figure 2 and in which the metering conduits 270 are misaligned with both distributing conduits 258 and discharge apertures 294, are filled with solids, and are being moved toward alignment with the discharge apertures.

The operation of the solids flow control device of this invention is readily apparent in Figure 4. Upon reciprocation of reciprocable tray 268 from the intermediate position shown in this figure to and from extremes to the left and right of the intermediate position, each metering conduit 270 is alternately aligned with the outlet opening 266 of distributing conduits 258 at the points indicated by $x$ so as to be filled with granular solids and then at the other extreme of tray travel is aligned with a discharge aperture 294 to discharge the solids therethrough from metering conduits 270.

If desirable, additional overflow apertures may be provided in lower stationary tray 290 in addition to the discharge apertures 294. This is to provide for the overflow of possible accumulations of granular solids below reciprocable tray 268.

In the solids stripping and flow control device of this invention as employed in the process described in connection with Figure 1, 19 stripping conduits were employed having an internal diameter of 8 inches and a total length of 15 $^{11}\!/_{16}$ inches and having a lower outlet opening 4 inches in inside diameter. The corresponding distributing conduits were provided with an upper flared portion which was 6½ inches in diameter. The distributing conduits were of dissimilar length, but were 16$^{7}\!/_{16}$ inches high, and were 3 inches in inside diameter. The reciprocable tray was provided with 19 metering conduits 3 inches inside diameter and 2 inches long, and was supported by four ¾ inch diameter rods. The motive means for reciprocating the tray consisted of an air cylinder driven by low pressure (150 p.s.i.g.) air and controlled by a cycle timer instrument adapted to reciprocate the tray 1 cycle per minute so as to discharge 860 pounds per hour of cobalt molybdate catalyst.

Although the present invention has been described in considerable detail with respect to the reforming and desulfurization of gasoline or naphtha and in the stripping and flow and velocity control of cobalt molybdate catalyst, it is to be understood that this description is intended to be illustrative only and that the process and apparatus herein described is applicable when similar advantages to the stripping and flow control of other solid contact materials in which solids stripping or other auxiliary contacting with a fluid is required, and in which positive control over the uniformity of solids velocity throughout the cross-sectional area of a contacting column is a necessity and in which a positive control over the volumetric or weight rate of granular solids transfer is desired.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:
1. In an apparatus for contacting a fluid stream with a granular solid contact material including a contacting column, inlet and outlet means for passing a stream of granular solid contact material through said column, and inlet and outlet means for passing a fluid stream to be contacted through said contacting column, the improved apparatus for controlling the rate and velocity of flow of solid contact material through said column and stripping residual fluids from said material without interfering with solids flow and velocity control which comprises an upper stationary transverse tray filling the cross section of said contacting column, a plurality of dependent stripping conduits dependent from said upper tray and arranged in a regular geometric pattern therebelow having an aggregate cross sectional area between about 10% and about 50% of that of the contacting column, a plurality of distributor conduits, one each depending from and spaced apart from the lower end of a corresponding stripping conduit and having their outlet openings arranged in an irregular geometric pattern consisting of a plurality of parallel rows of openings, the corresponding stripping and distributor conduits being spaced apart from each other so that a stripping fluid may be introduced through the space therebetween to pass only through said stripping conduit, means for controlling the rate of flow of stripping fluid into and through said space at a rate sufficient to remove residual fluids from the solids in said stripping conduits, a transverse reciprocable tray disposed inmmediately below said distributor conduit outlet openings and spaced downwardly therefrom, a plurality of metering conduits dependent from said reciprocable tray and arranged in a plurality of parallel rows in an irregular geometric pattern therebelow, a plurality of transverse dams comprising elongated strips disposed on their edge across the upper surface of said reciprocable tray between the adjacent rows of said metering conduits, a lower stationary tray disposed immediately below the lower openings of said metering conduits and having a plurality of discharge openings arranged in a plurality of parallel rows in an irregular geometric pattern, and means for reciprocating said reciprocable tray between said stationary trays so as to withdraw a series of equal volumes of said solid contact material from each of said distributor conduits.

2. An apparatus according to claim 1 wherein said irregular geometric patterns are arranged relative to one another so that upon reciprocation of said reciprocable tray each dependent metering conduit is alternately aligned with a distributing conduit outlet to receive a volume of solids therefrom while it is misaligned with any of said discharge openings and then aligned with a discharge opening to discharge said volume of solids while it is misaligned with any of said distributor conduit outlet openings.

3. An apparatus according to claim 1 wherein said reciprocable tray is suspended by supporting elements from said upper stationary tray.

4. An apparatus according to claim 1 wherein the aggregate cross sectional area of said stripping conduits is substantially less than that of said contacting column, and the aggregate cross sectional area of said distributor conduits is substantially less than that of said stripping conduits.

5. An apparatus according to claim 1 wherein said stripping conduits consist of an upper cylindrical section and a lower downwardly tapering section, said distributing conduits are provided at their upper ends with an upwardly flared portion spaced apart from and attached in solids-receiving relation to the lower outlet opening of said tapering section forming therebetween a stripping fluid engaging space through which the stripping fluid is introduced for passage upwardly through said stripping conduit.

6. In an apparatus for the contacting of a fluid with granular solid contact material comprising a vertically disposed contacting column adapted to confine a downwardly moving bed of said solid contact material, inlet and outlet conduit means for introducing and removing said contact material to and from said column, and inlet and outlet conduit means for passing a fluid to be contacted through said moving bed of material in said column, the improvement which comprises means for stripping residual fluids from said contact material and for accurately controlling the flow rate of solids through said column and the downward velocity of said material throughout the cross sectional area of said column without interference with solids flow by a flow of stripping fluid, said last named means comprising in combination an upper stationary tray transversely suported from the inner walls of said column, a plurality of vertical stripping conduits depending from said upper stationary tray and arranged in a regular geometric pattern and uniformly distributed throughout said tray, said stripping conduits having an aggregate cross section which is between about 10% and about 50% of that of said column and having lower open ends which are of less cross section than their upper open ends, a plurality of distributor conduits each having at its upper end an upwardly flared inlet portion spaced apart and dependent in solids receiving relation from the outlet end of a stripper conduit forming a fluid engaging space therebetween, said distributor conduits having an aggregate cross sectional area substantially less than that of said column and having their lower outlet openings arranged in an irregular geometric pattern consisting of a plurality of parallel rows of such openings, a stripping fluid inlet opening into said column at a point below said upper stationary tray through which a solids stripping fluid is admitted to pass into said fluid engaging space to contact said solid material in said stripper conduits, means in said inlet to control the rate of flow of said stripping fluid therethrough, a reciprocable tray having a cross sectional area less than that of said upper tray and supported a short distance below the lower openings of said distributor conduits and adapted to transverse reciprocation in a direction parallel to said rows of openings, a plurality of metering conduits open at both ends and dependent from said reciprocable tray and arranged in an irregular geometric pattern consisting of a plurality of parallel rows thereof parallel to the path of reciprocation, a plurality of transverse dams comprising elongated strips disposed on their edge across the upper surface of said reciprocable tray between the adjacent rows of said metering conduits, a lower stationary tray disposed below the lower open ends of said metering conduits and provided with a plurality of discharge openings arranged in an irregular geometric pattern consisting of a plurality of rows of openings which are parallel with the rows of metering conduits, means for reciprocating said reciprocable tray between said stationary trays, said irregular geometric patterns of said distributor conduit outlets, said metering conduits, and said discharge openings being disposed relative to each other so that during reciprocation of said reciprocable tray each metering conduit is alternately aligned with a distributor conduit outlet to receive a volume of solids therefrom while misaligned with all discharge openings and then is aligned with a discharge opening to discharge said volume therethrough while misaligned with all distributor conduit outlets so that volumes of solids are withdrawn from each distributor conduit at equal rates without interference from the flow of stripping fluid which flows through said fluid engaging space above said distributor conduits and upwardly through said stripper conduits.

7. An apparatus for simultaneously contacting moving granular solid contact material with a fluid and controlling the flow rate and velocity of said material so that no interference with such control results from said fluid flow which comprises a column through which said solids flow, an upper stationary tray transversely supported from the inner walls of said column, a plurality of vertical stripping conduits depending from said upper stationary tray and arranged in a regular geometric pattern and uniformly distributed throughout said tray, said stripper conduits having an aggregate cross section which is between about 10% and about 50% of that of said column and having lower open ends which are of less cross section than their upper open ends, a plurality of distributor conduits each having at its upper end an upwardly flared inlet portion spaced apart and dependent from the outlet end of a stripper conduit forming a fluid engaging space therebetween, said distributor conduits having an aggregate cross sectional area substantially less than that of said column and having their lower outlet openings arranged in an irregular geometric pattern consisting of a plurality of parallel rows of such openings, a stripping fluid inlet opening into said column at a point below said upper stationary tray through which a solids stripping fluid is admitted to pass into said fluid engaging space to contact said solid material in said stripper conduits, means in said inlet to control the quantity and velocity of fluid flow through said stripping conduits, a reciprocable tray having a cross sectional area less than that of said upper tray and supported a short distance below the lower openings of said distributor conduits and adapted to transverse reciprocation in a direction parallel to said rows of openings, a plurality of metering conduits open at both ends and dependent from said reciprocable tray and arranged in an irregular geometric pattern consisting of a plurality of parallel rows thereof parallel to the path of reciprocation, a plurality of transverse dams comprising elongated strips disposed on their edge across the upper surface of said reciprocable tray between the adjacent rows of said metering conduits, a lower stationary tray disposed below the lower open ends of said metering conduits and provided with a plurality of discharge openings arranged in an irregular geometric pattern consisting of a plurality of rows of openings which are parallel with the rows of metering conduits, means for reciprocating said reciprocable tray between said stationary trays, said irregular geometric patterns of said distributor conduit outlets, said metering conduits, and said discharge openings being disposed relative to each other so that during reciprocation of said reciprocable tray each metering conduit is alternately aligned with a distributor conduit outlet to receive a volume of solids therefrom while misaligned with all discharge openings and then is aligned with a discharge opening to discharge said volume therethrough while misaligned with all distributor conduit outlets so that volumes of solids are withdrawn from each distributor conduit at equal rates without interference from the flow of stripping fluid which flows through said fluid engaging space above said distributor conduits and upwardly through said stripper conduits.

References Cited in the file of this patent

UNITED STATES PATENTS

| | | |
|---|---|---|
| 2,335,610 | Plummer | Nov. 30, 1943 |
| 2,423,411 | Simpson | July 1, 1947 |
| 2,636,805 | Lassiat et al. | Apr. 28, 1953 |
| 2,642,206 | Reed | June 16, 1953 |
| 2,647,587 | Berg | Aug. 4, 1953 |
| 2,684,930 | Berg | July 27, 1954 |
| 2,694,672 | Mac Laren | Nov. 16, 1954 |
| 2,745,723 | Luntz | May 15, 1956 |
| 2,745,724 | Kollgaard | May 15, 1956 |